United States Patent
Popelka et al.

(10) Patent No.: US 11,606,272 B1
(45) Date of Patent: Mar. 14, 2023

(54) TECHNIQUES FOR CROSS PLATFORM COMMUNICATION PROCESS FLOW ANOMALY DETECTION AND DISPLAY

(71) Applicant: salesforce.com, inc., San Francisco, CA (US)

(72) Inventors: Aaron M. Popelka, San Francisco, CA (US); William Robert Jennings, II, Indianapolis, IN (US); Pranav Parekh, Bothell, WA (US); Xiuchai Xu, Sunnyvale, CA (US); Sullivan McIntyre, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/478,258

(22) Filed: Sep. 17, 2021

(51) Int. Cl.
| | | |
|---|---|---|
| *G06F 11/34* | (2006.01) | |
| *G06F 11/07* | (2006.01) | |
| *G06F 11/32* | (2006.01) | |
| *G06F 9/50* | (2006.01) | |
| *H04L 43/062* | (2022.01) | |
| *H04L 43/0811* | (2022.01) | |
| *H04L 43/067* | (2022.01) | |

(52) U.S. Cl.
CPC .......... *H04L 43/062* (2013.01); *H04L 43/067* (2013.01); *H04L 43/0811* (2013.01)

(58) Field of Classification Search
CPC ... H04L 43/062; H04L 43/067; H04L 43/0811
See application file for complete search history.

(56) References Cited

U.S. PATENT DOCUMENTS

| | | | | |
|---|---|---|---|---|
| 9,880,881 | B1 * | 1/2018 | Perez | H04L 67/62 |
| 10,326,676 | B1 * | 6/2019 | Driggs | H04L 41/142 |
| 11,165,823 | B2 * | 11/2021 | Wu | H04L 63/1416 |
| 2016/0078120 | A1 * | 3/2016 | Pradeep | G06F 11/3476 |
| | | | | 707/737 |
| 2019/0065298 | A1 * | 2/2019 | Leverich | G06F 11/0709 |
| 2020/0267057 | A1 * | 8/2020 | Garvey | H04L 41/0654 |
| 2020/0327419 | A1 * | 10/2020 | Zhang | G06F 17/18 |
| 2021/0374027 | A1 * | 12/2021 | Joglekar | G06F 11/3072 |

\* cited by examiner

*Primary Examiner* — Christopher B Robinson
(74) *Attorney, Agent, or Firm* — Holland & Hart LLP

(57) ABSTRACT

Methods, apparatuses, and computer program products are described. A system may analyze a set of communication metrics associated with a communication process flow that controls electronic communications between a tenant and a set of users corresponding to the tenant. The system may detect an occurrence of an anomaly based on a communication metric of the analyzed set of communication metrics satisfying a communication metric threshold. The system may generate, based on detecting the occurrence if the anomaly, a data object comprising metadata associated with the anomaly. In some cases, the system may transmit, to a communication platform, a request that includes the data object, where the request is configured to cause posting of an entry of the data object into a communication channel of the communication platform that is associated with the tenant.

18 Claims, 10 Drawing Sheets

TECHNIQUES FOR CROSS PLATFORM COMMUNICATION PROCESS FLOW ANOMALY DETECTION AND DISPLAY

FIELD OF TECHNOLOGY

The present disclosure relates generally to database systems and data processing, and more specifically to techniques for cross platform communication process flow anomaly detection and display.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support systems that are used to create, manage, and update communication process flows. For example, a communication process flow management service may be used to design and implement communication process flow that control communications between a tenant and a set of users (e.g., subscribers). Data analysis systems may analyze the data associated with communication process flows to identify and surface communication metrics (e.g., open rates, click rates). In addition, a communication platform separate from the cloud platform may be used for internal communications related to cloud platform functionality. However, because the communication platform and the cloud platform are implemented in separate computing systems, cross-platform data sharing, data access, and process flow management may be difficult, which may result in workflow inefficiencies and limited cross-platform compatibility.

SUMMARY

Techniques described herein are used to support cross platform data sharing, access, and management between a communication process flow management platform and a communication platform. Specifically, techniques described herein support integrating the communication process flow management service, the communication platform, and an anomaly detection program such that users may post data objects (e.g., descriptions, charts, etc.) displaying anomalies detected from the anomaly detection program in the communication platform. For example, if the anomaly detection program detects an anomaly in data from a communication process flow, then the anomaly detection program may post the data associated with the anomaly in the connected communication platform, which may be a communications channel. A description, chart, or other representation of the anomaly may be shown in the channel. As an example, the anomaly detection program may analyze the data associated with the communication process flow periodically (e.g., once a day). If the anomaly detection program detects a change in metrics (e.g., open rate, click rate) that is significantly significant (e.g., relative to the past 90 days), then the anomaly detection program may post the data about the anomaly to the communication process flow.

DETAILED DESCRIPTION

Figure 1:
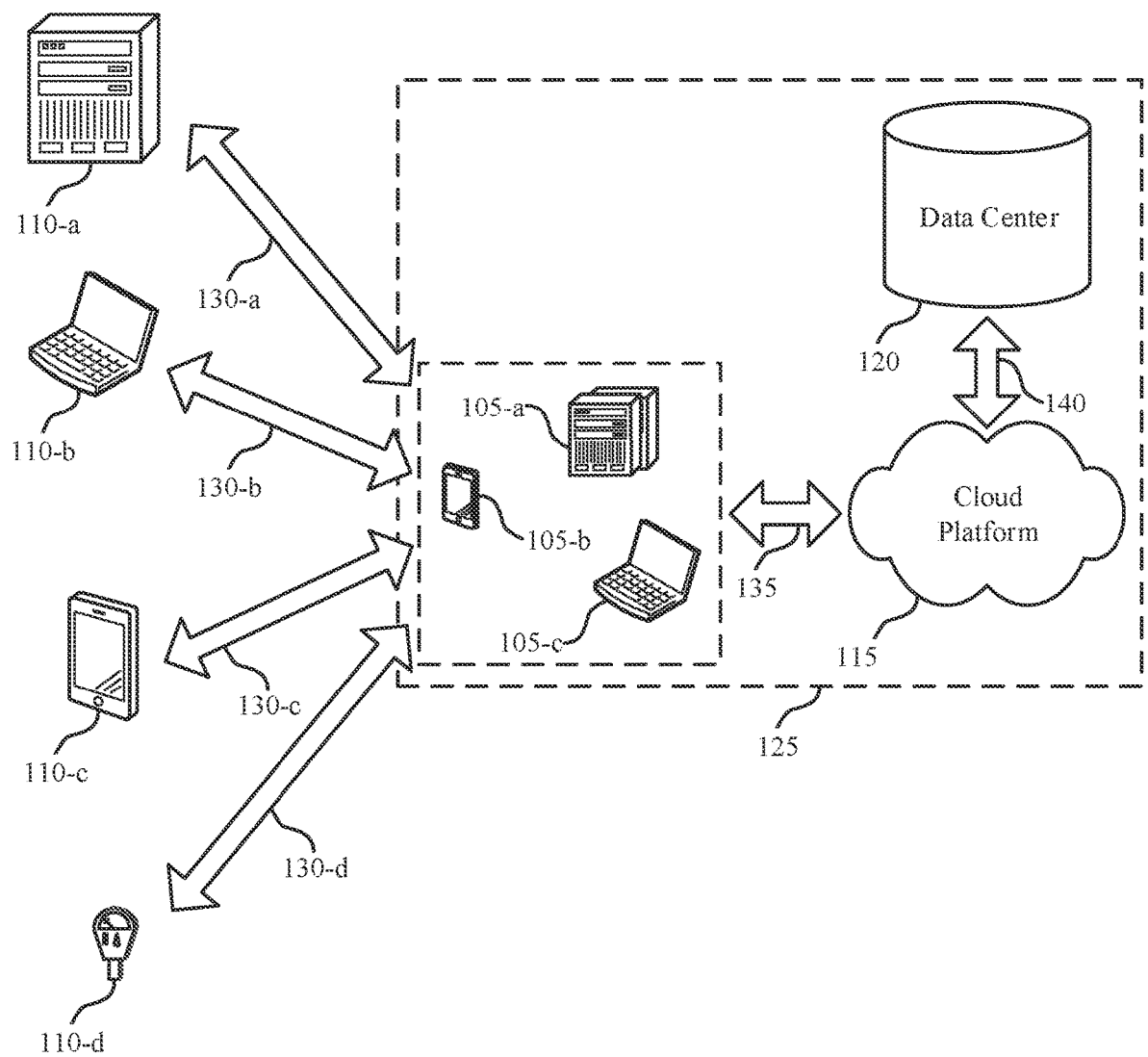
FIG. 1 illustrates an example of a data processing system that supports techniques for cross platform communication process flow anomaly detection and display in accordance with aspects of the present disclosure.

Techniques described herein support cross-platform compatibility between a communication process flow management service and a communication platform. A communication process flow management service may support creation, configuration, management, and deployment of a communication process flow that manages communications between a set of users and a tenant. For example, an organization or tenant may use the communication process flow management service to schedule and manage communications between the organization and a set of users, which may be examples of subscribers, customers, or prospective customers of the organization. Users may receive electronic communications (e.g., emails, messages, advertisements) according to a communication process flow. The communication process flow may include various actions and message configurations, and a user's receipt of various communications may be dependent on attribute data associated with the users and user web behavior, among other parameters.

Administrative users or employees associated with the tenant may access various services that monitor communication metrics associated with a communication process flow. For example, some services may provide statistics, such as open rate, click rate, unsubscribe rate, and the like, associated with one or more electronic communications controlled by a communication process flow. These statistics or metrics may be used to manually or automatically tweak aspects of the communication process flow. For example, these metrics may be used to support changing of content items (e.g., subject lines, images) included in an electronic communications, changing of communication frequency or transmission times, and other various communication configurations. The same or other services may also monitor these metrics to detect anomalies associated with the communications. For example, if the service detects that an open rate drops well below an expected open rate, then an alert may be surfaced to one or more administrative users. Thus, various aspects may be used to support communication process flow management and optimization.

In some cases, these administrative users or employees associated with the tenant (e.g., a marketing team) may communicate, plan, and monitor aspects of a communication process flow using an external communication platform. For example, the external communication platform may support communication channels that are organized by topic, and team members may use these channels (e.g., chat rooms) to perform business communications associated with a communication process flow. However, because the external communication platform is separate from the communication process flow management service, the data associated with the communication process flow (e.g., communication metrics, events, anomalies) is siloed with the computing systems supporting the communication process flow management service. Additionally, the data may support decisions associated with a communication process flow, such as stopping, pausing, or modifying configurations of the process flow. Again, because these decisions may occur within the communication platform that is separate from the communication process flow, a user may be required to access the communication platform management service to activate such changes or actions.

Techniques described herein support cross-platform compatibility between a communication process flow management service and an external communication platform. In some cases, the techniques described herein support posting of various communication metrics, events, and the like occurring in association with a communication process flow into the external communication platform as well as interaction with the communication process flow from the communication platform. These techniques thereby support improved workflow efficiencies as well as reduced communication resource overhead.

Specifically, the techniques described herein integrate the communication process flow management service, the communication platform, and an anomaly detection program such that users (e.g., marketing cloud users) may post data objects (e.g., descriptions, charts, etc.) displaying anomalies detected from the anomaly detection program in the communication platform. Specifically, if the anomaly detection program detects an anomaly in data from a communication process flow (e.g., if the number of people using the communication process flow management service change significantly, if an open rate changes significantly), then the anomaly detection program may post the data associated with the anomaly in the connected communication platform (e.g., a communication channel). A description, chart, or other representation of the anomaly may be shown in the communication channel. For example, the anomaly detection program may analyze the data associated with the communication process flow periodically (e.g., once a day). If the anomaly detection program detects a change in metrics (e.g., open rate, click rate) that is significantly significant (e.g., relative to the past 90 days), then the anomaly detection program may post the data about the anomaly to the communication process flow.

Aspects of the disclosure are initially described in the context of an environment supporting an on-demand database service. Aspects of the disclosure are then described in the context of computing architectures and process flows. Aspects of the disclosure are further illustrated by and described with reference to apparatus diagrams, system diagrams, and flowcharts that relate to techniques for cross platform communication process flow anomaly detection and display.

FIG. 1 illustrates an example of a system 100 for cloud computing that supports techniques for cross platform communication process flow anomaly detection and display in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 and/or subsystem 125 may support a communication process flow management service. The communication process flow management service may be used to configure a communication process flow that manages electronic communications (e.g., emails, messages, advertisements) between a tenant (e.g., client 105) of a multitenant system and a set of users (e.g., contacts 110) associated with the tenant. The communication process flow may include various actions that are used to manage the electronic communications. The actions may include send email, decision splits, wait periods, and the like, and the communication process flow may include multiple routes (or sets of actions) that are configured via the management service. Whether a user receives messages according to various routes may depend on attribute and behavior data associated with the user. Such data may be stored in association with user identifiers at the data center 120.

Communication process flows may be configured by teams of administrators or users associated with the tenant (e.g., employees of the tenant organization). In some cases, various levels of configuration, review, activation, and monitoring may be performed by multiple users using the communication process flow management service. These multiple users may communicate regarding performance and planning associated with a communication process flow via communication platforms that are external from the cloud platform 115 and/or subsystem 125 that supports the communication process flow and the communication process flow management service. For example, the users may communicate via a communication platform that supports chat rooms or channels that may be organized by topic, teams, or the like.

However, because the communication platform is external to the communication process flow management service, limited cross-platform compatibility may exist. For example, data associated with an active communication process flow (e.g., a flow that is managing current and future communications) may only be accessible at the communication process flow management service. Thus, discussion of such data at a communication platform may require a user to manually post the data into the communication platform. Further, such discussion in a communication platform may result in a decision to interact with the communication process flow (e.g., by modifying the communication process flow or activating, pausing, etc. the communication process flow). As such discussion and decisions may occur within the communication platform, the user is required to access the communication process flow management service to modify the communication process flow or interact with the communication process flow. Thus, the separation of data and access between the communication process flow and the communication platform may result in workflow inefficiencies and limited cross-platform compatibility. Additionally, because a user may be required to interact with a communication process flow directly within the communication process flow management service, the communication process flow may utilize significant processing and communication resources by transmitting electronic communications before a user is able to interact with the communication process flow. Real time or near-real time interaction with a communication process flow may reduce wasteful communications.

Techniques described herein may support cross-platform interaction and data access between a communication process flow management service supported by the cloud platform 115 and an external communication platform. In some cases, the communication process flow management service and the cloud platform may be linked for intercommunication and interaction. The communication process flow management service may periodically, or upon satisfaction of some condition, post communication metrics associated with a communication process flow into one or more channels of the communication platform. The communication process flow management service may also post logs, updates, events, or the like associated with the communication process flow into one or more channels of the communication platform. The communication metrics and/or logs may be posted in the form of text, graphs, or a combination thereof. Additionally, a user may interact with the communication process flow management service directly from the communication platform. The interactions with the communication process flow from the communication platform may be performed in response to the posting of the metrics and/or events into the communication platform by the communication process flow management service.

The cloud platform 115 may integrate the communication process flow management service, the communication platform, and an anomaly detection program such that users may post data objects (e.g., descriptions, charts, etc.) displaying anomalies detected from the anomaly detection program in the communication platform. Specifically, if the anomaly detection program detects an anomaly in data from a communication process flow (e.g., if the number of people using the communication process flow management service change significantly, if an open rate changes significantly), then the anomaly detection program may post the data associated with the anomaly in the connected communication platform (e.g., a communication channel). A description, chart, or other representation of the anomaly may be shown in the communication channel. For example, the anomaly detection program may analyze the data associated with the communication process flow periodically (e.g., once a day). If the anomaly detection program detects a change in metrics (e.g., open rate, click rate) that is significantly significant (e.g., relative to the past 90 days), then the anomaly detection program may post the data about the anomaly to the communication process flow.

Cross-platform interaction between the communication process flow management service and the communication platform may support improved workflow efficiencies and reduced processing overhead by reducing wasteful communications and data access requests. For example, as the techniques described herein support data associated with a communication process flow being accessible from the communication platform, the techniques may support reduced data access requests at the communication platform. As another example, as the techniques described herein support interaction with a communication process flow directly from the communication platform, the techniques may support reduced use of wasteful communication resources. Additionally, the techniques support reduced overhead associated with switching between various platforms to perform various tasks.

It should be appreciated by a person skilled in the art that one or more aspects of the disclosure may be implemented in a system 100 to additionally or alternatively solve other problems than those described above. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
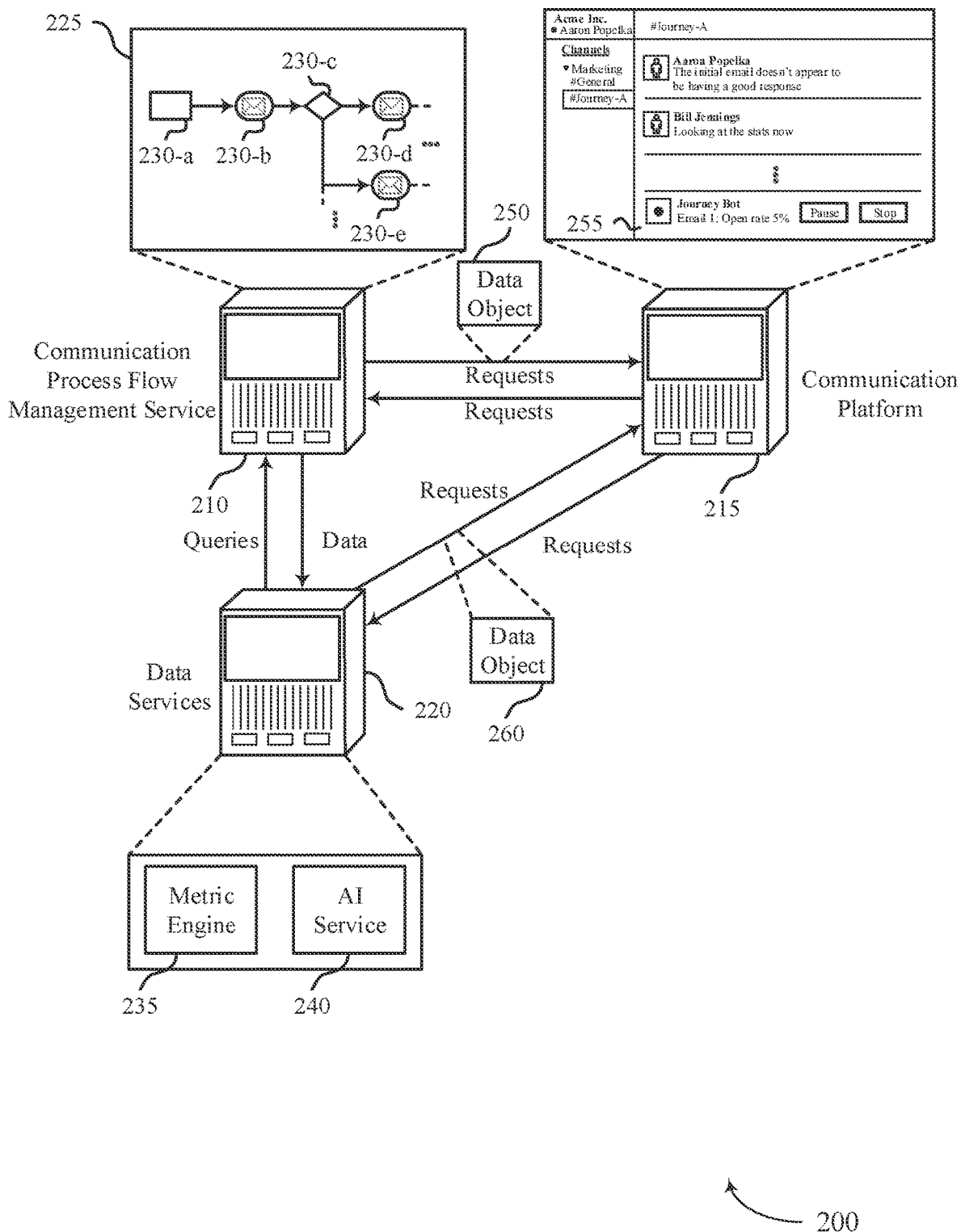
FIG. 2 illustrates an example of a computing architecture that supports techniques for cross platform communication process flow anomaly detection and display in accordance with aspects of the present disclosure.

FIG. 2 illustrates an example of a computing architecture 200 that supports techniques for cross platform communication process flow anomaly detection and display in accordance with aspects of the present disclosure. The computing architecture 200 includes a communication process flow management service 210, a communication platform 215, and a data services platform 220. Each of the communication process flow management service 210, the communication platform 215, and the data services platform 220 may be implemented in respective servers. In some cases, the server that supports the communication process flow management service 210 may represent aspects of the cloud platform 115 and subsystem 125 of FIG. 1. The data services platform 220 may also be implemented in aspects of the cloud platform 115 and subsystem 125 of FIG. 1. The systems supporting the communication platform 215 may be a logically or physical separate computing systems from the systems supporting the communication process flow management service 210 and/or data services platform 220.

As described herein, the communication process flow management service 210 may support creation, configuration, and implementation of various communication process flow (e.g., a communication process flow 225) that controls electronic communications between a tenant and a set of users associated with the tenant. For example, users associated with the tenant may use the communication process flow management service 210 to configure actions (e.g., actions 230) that are associated with processor executable instructions for management of electronic communications. For example, action 230-a may be associated with instructions that are used to filter users into the communication process flow 225. That is, action 230-a may define a rule that is used to determine whether a user of a set of users (e.g., associated with a tenant) is to receive electronic communications based on the communication process flow 225. The rule may be based on attribute data and/or web behavior data. For example, users that have purchased a product from the tenant organization in the last six months may receive electronic communications from the tenant based on the communication process flow 225. Users that do not satisfy this rule may not "enter" this example communication process flow 225.

Other actions 230 define message transmissions, decision splits, and other processes. For example, each user that satisfies the rule of action 230-a may receive an email according to action 230-b. The action 230-b may be associated with specific content that is to be emailed to the users. Action 230-c may define a decision split between users. For example, users that opened the email corresponding to action 230-b may be routed to action 230-d, while users that did not open the email corresponding to action 230-b may be routed to action 230-e. Additionally or alternatively, the decision split action 230-c may consider attribute data associated with users, web behavior data (e.g., web page interaction), among other parameters, to route users through the communication process flow 225.

Data services platform 220 may correspond to various services that monitor, aggregate, and display various metrics associated with the communication process flows supported by the communication process flow management service 210. For example, the data services platform 220 may include a metric engine 235 that generates and/or displays engagement metrics, such as open rate, click rate, unsubscribe rate, send rate, and the like associated with one or more electronic communications of the communication process flows supported by the communication process flow management service 210. The engagement metrics may be displayed in charts or graphs. The data services platform 220 may also support an artificial intelligence (AI) service 240 that analyzes communication data associated with the communication process flow supported by the communication process flow management service 210. In some cases, the AI service 240 may identify, using AI techniques, anomalies associated with the communications. For example, if a communication metric (e.g., open rate) for communication process flow 225 falls below an expected threshold, then the AI service 240 may surface an alert. The metric engine 235 and the AI service 240 may be implemented as part of the same service (e.g., supported by the same server) or separate/distinct services. The data services platform 220 may transmit queries or requests to a data store associated with or managed by the communication process flow management service 210 to support metrics and anomaly detections. That is, the data services platform 220 may receive communication data from the communication process flow management service 210 to support metric generation and AI services.

The communication platform 215 may represent a chat or instant messaging service that is used to support business function. For example, teams associated with a tenant may use the communication platform 215 to communicate regarding various business functions, including communication process flows supported by the communication process flow management service 210. The teams may use the communication platform to hold a continuous discussion regarding aspects of the communication process flow 225, make decisions regarding the communication process flow 225, and the like. For example, based on data generated by the data services platform 220, the users may decide to reconfigure or interact with the communication process flow 225. However, as described herein, the communication process flow management service 210 and the communication platform 215 are separate platforms, and as such, have limited cross-platform compatibility. Thus, if a decision is made regarding the communication process flow 225 within the communication platform 215, a user may be required to separately access the communication process flow management service 210 to change or interact with the communication process flow 225. Further, the data services platform 220 and the communication platform 215 may be separate systems, and as such, a user may be required to manually input data (e.g., metrics and/or anomalies) regarding the communication process flow 225 into a channel of the communication platform 215 to impact discussions.

Techniques described herein support cross-platform compatibility between the communication process flow management service 210, the communication platform 215, and the data services platform 220. To support such compatibility, the communication platform 215 may be configured with endpoints (e.g., a webhook or application) that are used by the communication process flow management service 210 and/or the data services platform 220 to transmit request to the communication platform 215. The requests may include data objects (e.g., data object 250) that are ingestible by the communication platform 215 for posting into one or more channels. Thus, the data objects 250 may include data regarding events occurring at the communication process flow management service 210, metrics detected by the metric engine 235, and/or anomalies detected by the AI service 240.

Further, the communication platform may be configured to transmit requests to the communication process flow management service 210 and/or the data services platform 220. For example, a user may enter a command or active a user interface (UI) component within the communication platform 215 to request additional data associated with the communication process flow 225 (e.g., refined metrics or additional data associated with the anomaly). In some cases, a user may interact directly with the communication process flow 225 by entering a command or activating a UI component within the communication platform 215. The interaction may include pausing the communication process flow 225 in response to data being posted within the communication platform 215.

To support the cross-platform compatibility, the various services may be configured with endpoints and authorizations. For example, a user may manually enter an endpoint associated with a workspace (e.g., collection of communication channels) or a particular channel at the communication platform into the communication process flow management service 210 and/or the data services platform 220. In some cases, an application may be downloaded to interact with the communication platform 215. The application may include various authentication flows and setup flows to configure the endpoints for the various services. Thus, when setting application, the user may log into the account for the communication process flow management service 210 to authenticate the user and to setup the respective endpoints.

After configuring the respective services with the endpoints, the endpoints may be used to transmit requests with data objects to post the data into the communication platform. The entries (e.g., an entry 255) may be posted by a participant to the channel (e.g., a bot that is configured to post into the channel).

Figure 3:
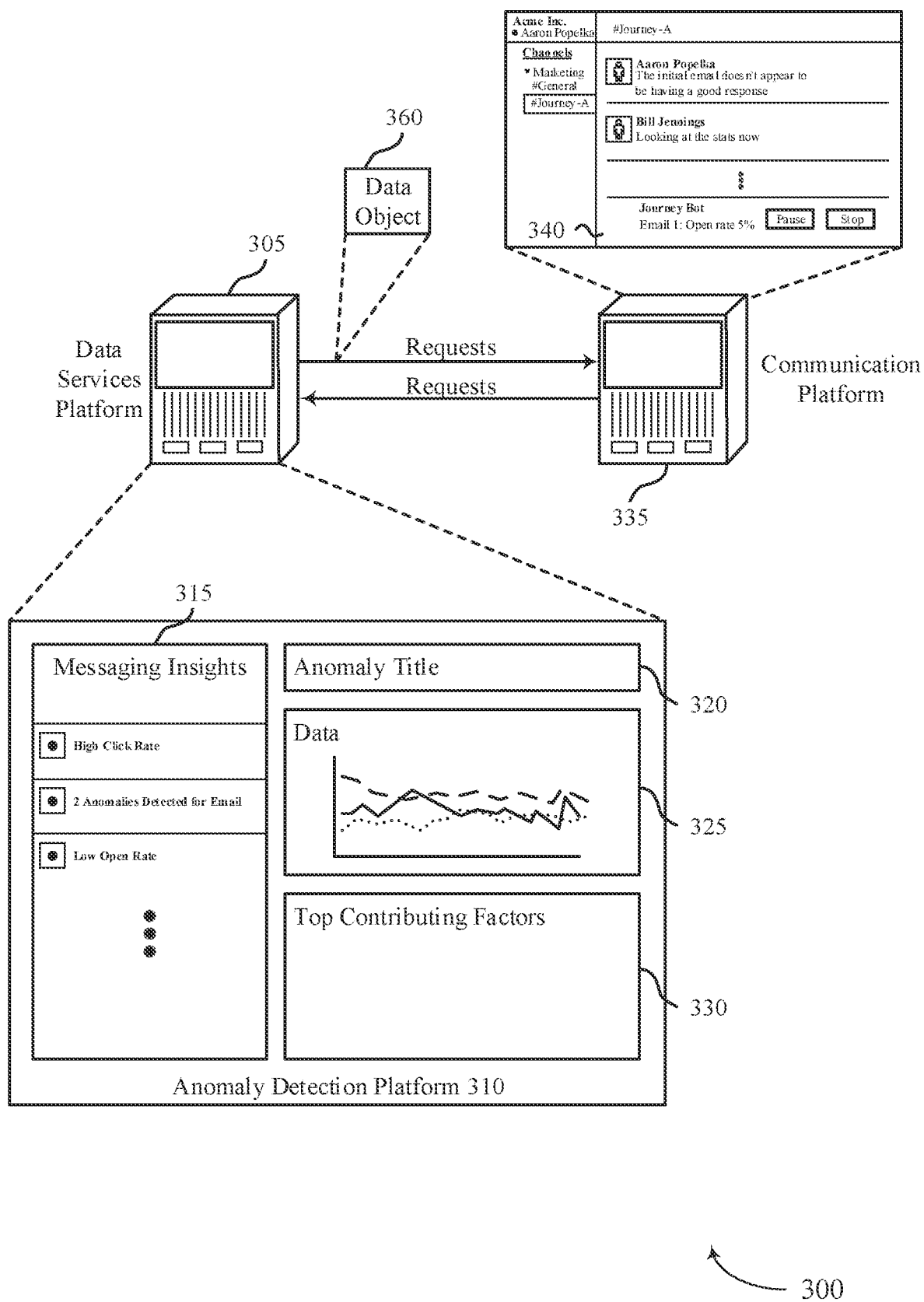
FIG. 3 illustrates an example of a computing architecture that supports techniques for cross platform communication process flow anomaly detection and display in accordance with aspects of the present disclosure.

FIG. 3 illustrates an example of a computing architecture 300 that supports techniques for cross platform communication process flow anomaly detection and display in accordance with aspects of the present disclosure. The computing architecture 300 includes a data services platform 305 and a communication platform 335. Each of the data services platform 305 and the communication platform 335 may be implemented in respective servers. In some cases, the data services platform 305 may be implemented in aspects of the cloud platform 115 and subsystem 125 of FIG. 1. The systems supporting the communication platform 335 may be a logically or physical separate computing systems from the systems supporting a communication process flow management service and/or the data services platform 305.

As described herein, the communication process flow management service may support creation, configuration, and implementation of various communication process flow (e.g., a communication process flow) that controls electronic communications between a tenant and a set of users associated with the tenant. The data services platform 305 may correspond to various services that monitor, aggregate, and display various metrics associated with the communication process flows supported by the communication process flow management service. For example, the data services platform 305 may include a metric engine that generates and/or displays engagement metrics, such as open rate, click rate, unsubscribe rate, send rate, and the like associated with one or more electronic communications of the communication process flows supported by the communication process flow management service. The engagement metrics may be displayed in charts or graphs.

The data services platform 305 may also support an anomaly detection platform 310 (e.g., the AI service 240 described with reference to FIG. 2) that analyzes communication data associated with the communication process flow supported by the communication process flow management service. In some cases, the anomaly detection platform 310 may identify, using AI techniques, anomalies associated with the communications. For example, if a communication metric (e.g., an open rate, a click rate, an unsubscribe rate) for communication process flow falls below an expected threshold, then the data services platform 305 may surface an alert. The metric engine and the anomaly detection platform 310 (e.g., the AI service) may be implemented as part of the same service (e.g., supported by the same server) or separate/distinct services. The data services platform 305 may transmit queries or requests to a data store associated with or managed by the communication process flow management service to support metrics and anomaly detections. That is, the data services platform 305 may receive communication data from the communication process flow management service to support metric generation and anomaly detection platforms.

The communication platform 335 may represent a chat or instant messaging service that is used to support business function. For example, teams of users associated with a tenant may use the communication platform 335 to communicate regarding various business functions, including communication process flows supported by the communication process flow management service. The teams may use the communication platform to hold a continuous discussion regarding aspects of the communication process flow, make decisions regarding the communication process flow, and the like. For example, based on data generated by the data services platform 305, the users may decide to reconfigure or interact with the communication process flow. As described herein, the computing architecture 300 may support cross-platform compatibility between the communication process flow management service, the communication platform 335, and the data services platform 305. To support such compatibility, the communication platform 335 may be configured with endpoints (e.g., a webhook or application) that are used by the communication process flow management service and/or the data services platform 305 to transmit request to the communication platform 335. The requests may include data objects that are ingestible by the communication platform 335 for posting into one or more channels. Thus, the data objects may include data regarding events occurring at the communication process flow management service, metrics detected by the metric engine, and/or anomalies detected by the anomaly detection platform 310.

In some examples, the anomaly detection platform 310 may include a set of machine learning and AI features to identify the anomalies associated with communication metrics. For example, the anomaly detection platform 310 may detect an anomaly in a communication metric (e.g., an open rate, a click rate, an unsubscribe rate) for the communication process flow, and may alert users associated with the tenant (e.g., a marketing team) of the anomaly using the communication platform 335. The anomaly detection platform 310 may monitor the performance of one or more communication metric (e.g., open rate of emails) every day, and may compare the actual performance of the one or more communication metrics to an expected performance derived by the machine learning feature of the anomaly detection platform 310 for the last 90 days. The data services platform 305 may notify the users of any anomalous behaviors and/or patterns (e.g., insights) in the communication metrics via an entry 340 in the communication platform 335. Anomalies may be analyzed and detected for emails, communication process flow activities, and automations (e.g., a UI used for putting together activities that may occur over time).

In some cases, the data services platform 305, using the anomaly detection platform 310, may analyze a set of communication metrics associated with the communication process flow that controls electronic communications between a tenant and a set of users corresponding to the tenant, where the electronic communications may include email sends, the performance of the communication process flow, and emails sends within the communication process flow, among others. The data services platform 305 may analyze the set of communication metrics according to a schedule associated with the communication process flow. Additionally or alternatively, the data services platform 305 may analyze the set of communication metrics associated with transmission of an electronic communication to the set of users (e.g., an email), where the data object may include an indication of at least of the set of communication metrics associated with the transmission of the electronic communication. The data services platform 305 may also analyze the set of communication metrics for an aggregated set of electronic communication transmissions to various subsets of the set of users according to the communication process flow, where the data object may include an indication of at least one of the set of communication metrics associated with the aggregated set of electronic communication transmissions.

The data services platform 305 may detect an occurrence of an anomaly based on a communication metric of the analyzed set of communication metrics satisfying a communication metric threshold. For example, the data services platform 305, through the anomaly detection platform 310, may identify a click rate anomaly of email activities in the communication process flow or a high click rate for an email send. The anomaly detection platform 310 may display the one or more detected anomalies using messaging insights 315 (e.g., in a UI for the anomaly detection platform 310). The messaging insights 315 may include, for each detected anomaly, the type of anomaly (e.g., a high open rate, a click rate anomaly), where the anomaly occurred (e.g., the email "Year-End Sale 2020," the communication process flow "Welcome Series"), some contextual data associated with the anomaly (e.g., a percentage that the communication metric performance was higher or lower than expected), and the date the anomaly may have occurred. A user may select an anomaly in the messaging insights 315 to view, and that anomaly may be displayed in an anomaly title 320 (e.g., "High Open Rate for Email" "Year-End Sale 2020"). The anomaly title 320 may also include a job identifier, a name of the email or the communication process flow corresponding to the anomaly, a corresponding date and time (e.g., of an email send), and a total number of emails sent.

The anomaly detection platform 310 may also show data 325 associated with the anomaly. For example, the data 325 may include a bar chart showing the level of performance of a particular communication metric (e.g., the open rate for a particular email) for which an anomaly was detected. The bar chart may show upper and lower bounds corresponding to values the machine learning feature of the anomaly detection platform 310 anticipated the communication metric to perform. The data 325 may also indicate the actual and expected rates of the communication metric, and may indicate a percentage that the actual communication metric performance may be above or below the expected communication metric performance. Upon the anomaly detection platform 310 identifying that the communication metric performed outside of the machine learning-derived boundaries, the anomaly detection platform may detect an anomaly. In some examples, the data 325 may include a line chart showing the performance of a communication metric (e.g., low open rate of an email) over time. The data 325 may similarly display a lower bound and an upper bound corresponding to the expected performance of the communication metric, and may compare the actual performance of the communication metric to the lower and upper bounds.

Additionally, the anomaly detection platform 310 may display top contributing factors 330 which may include a set of constituent factors within the communication (e.g., an email send) that may have impacted the anomaly associated with the corresponding communication metric. For example, the top contributing factors 330 may include a factor associated with the subject line of the email (e.g., subject line length is medium), and the time the email was sent (e.g., the email was sent on Sunday), for a click rate anomaly, and the top contributing factors 330 may include a name of a communication process flow (e.g., an activity name, "Welcome Email"), a name of the email, and percentages indicating the change in open rate between different emails sent. The top contributing factors 330 may also display a signal strength corresponding to each factor which may indicate how much that factor impacted the communication metric as calculated by the anomaly detection platform 310.

The data services platform 305 may generate a data object including metadata associated with the anomaly based on the anomaly detection platform 310 detecting the occurrence of the anomaly. For example, the metadata may include the information described herein and shown in the anomaly title 320, the data 325, and the top contributing factors 330 for each detected anomaly. In some examples, the data services platform 305 may generate a JavaScript object notation (JSON) object including data associated with the anomaly, the JSON object being ingestible by the communication platform for posting the entry into a communication channel of the communication platform 335. Additionally or alternatively, the data services platform 305 may generate the data object that includes an indication of a change in the communication metric relative to a predicted communication metric (e.g., by the machine learning component of the data services platform 305), an indication of an amount of electronic communications (e.g., emails) associated with the communication metric, or a combination thereof.

The data services platform 305 may transmit a request to the communication platform 335, where the request may include the data object and may be configured to cause posting of an entry of the data object (e.g., the entry 340) into a communication channel of the communication platform 335. For example, a user may enter a command or active a UI component within the communication platform 335 to request additional data associated with the communication process flow (e.g., additional data associated with the anomaly). In some cases, a user may interact directly with the communication process flow by entering a command or activating a UI component within the communication platform 335. The interaction may include pausing the communication process flow in response to data being posted within the communication platform 335.

Further, the communication platform 335 may be configured to transmit requests to the data services platform 305. For example, a user may enter a command or active a UI component within the communication platform 335 to request additional data associated with the communication process flow (e.g., additional data associated with the anomaly). In some cases, a user may interact directly with the communication process flow by entering a command or activating a UI component within the communication platform 335. The interaction may include pausing the communication process flow in response to data being posted within the communication platform 335.

In some examples, a user may enable a feature to receive insights about anomalies detected by the anomaly detection platform 310 in the communication platform 335. For example, the entry 340 may be a message from the data services platform 305 indicating a detected anomaly. If at least one anomaly is detected for a communication metric (e.g., at least one anomaly daily), then the data services platform 305 may post an entry corresponding to each anomaly to a particular channel in the communication platform 335 daily. If no anomalies are detected, then the data services platform 305 may refrain from posting the entry. For example, the entry 340 may display the type of anomaly or insight (e.g., high open rate), which email or communication process flow the anomaly occurred for, the data of occurrence, and some contextual information associated with the anomaly, such as a percentage that the communication metric performed higher or lower than expected. The entry 340 may also indicate how many emails or communication process flow activities may have occurred in that particular day.

In some examples, the data services platform 305 may receive, from the communication platform 335 and in response to transmitting the request, a second request for additional information associated with the detected anomaly. The data services platform 305 may identify one or more contributing factors associated with the detected anomaly as the additional information. The data services platform 305 may then generate a second data object that includes the addition information associated with the detected anomaly based on receiving the second request, and may transmit, to the communication platform 335, a request that may include the second data object, the request configured to cause the UI with the additional information to be displayed in the communication platform 335 (e.g., via the entry 340). For example, a user may request information regarding the top contributing factors 330 corresponding to an anomaly. If the anomaly is associated with a communication process flow, the top contributing factors 330 may include the top three emails sent that most impacted the communication process flow, which may be displayed to the user in the entry 340. If the anomaly is associated with an email, the entry 340 may show factors such as subject line and the date and time sent, which may have contributed to the anomaly. Additionally or alternatively, the identified one or more contributing factors may be an identified electronic communication associated with the communication process flow, an indication of one or more content items associated with an electronic communication of the communication process flow, or a combination thereof. In some cases, the entry 340 may include an image of the data 325 based on the type of anomalies that may have been detected.

In some examples, the user may view additional information about a particular anomaly in the anomaly detection platform 310. For example, the data services platform 305 may generate a data object that includes an indication of a link to the anomaly detection platform 310 that detects the occurrence of the anomaly. The data services platform 305 may receive, from the communication platform 335 and in response to transmitting the data object, a second request to view a UI associated with the occurrence of the anomaly (e.g., the messaging insights 315, the anomaly title 320, the data 325, and the top contributing factors 330). The data services platform 305 may display, based on receiving the second request, the UI associated with the occurrence of the anomaly, where the UI may include an indication of the communication metric (e.g., open rate of an email). Additionally or alternatively, the communication platform 335 may display other anomalies associated with bash email sends, automations, and the like.

Figure 4:
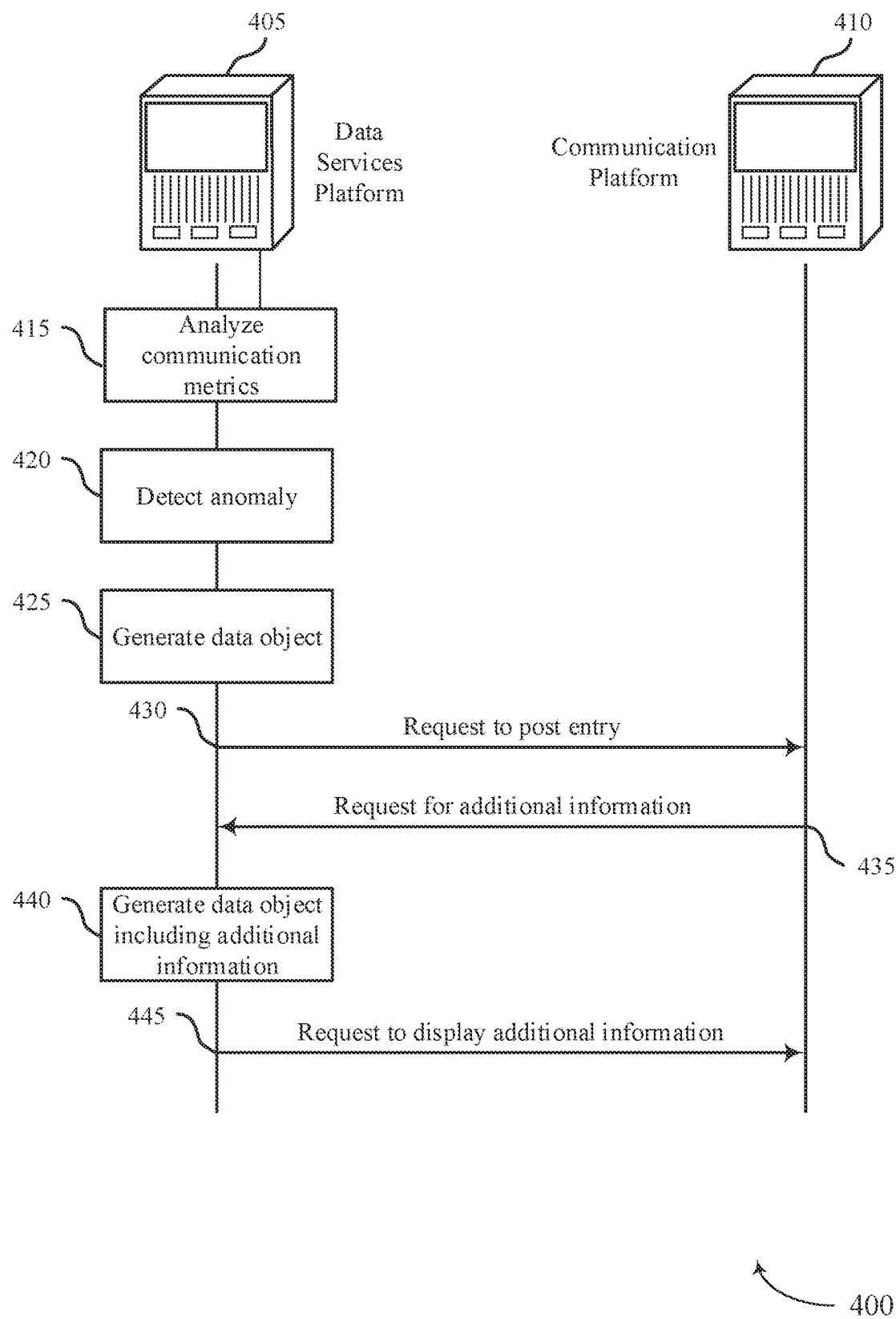
FIG. 4 illustrates an example of a process flow that supports techniques for cross platform communication process flow anomaly detection and display in accordance with aspects of the present disclosure.

FIG. 4 illustrates an example of a process flow 400 that supports techniques for cross platform communication process flow anomaly detection and display in accordance with aspects of the present disclosure. The process flow 400 may implement aspects of the computing architectures 200 and 300, or may be implemented by aspects of the computing architectures 200 and 300. The process flow 400 may include an data services platform 405 and a communication platform 410. In the following description of the process flow 400, the operations between the data services platform 405 and the communication platform 410 may be performed in different orders or at different times. Some operations may also be left out of the process flow 400, or other operations may be added. Although the data services platform 405 and the communication platform 410 are shown performing the operations of the process flow 400, some aspects of some operations may also be performed by one or more other devices, or may be performed by other devices included in the process flow.

At 415, the data services platform 405 may analyze a set of communication metrics associated with a communication process flow that may control electronic communications between a tenant and a set of users corresponding to the tenant. In some examples, the data services platform 405 may analyze the set of communication metrics according to a schedule associated with a communication process flow. Additionally or alternatively, the data services platform 405 may analyze the set of communication metrics associated with transmission of an electronic communication to the set of users, where the data object may include an indication of at least one of the set of communication metrics associated with the transmission of the electronic communication. In some examples, the data services platform 405 may analyze the set of communication metrics for an aggregated set of electronic communication transmissions to various subsets of the set of users according to the communication process flow, where the data object may include an indication of at least one of the set of communication metrics associated with the aggregated set of electronic communication transmissions. In some cases, the data services platform 405 may analyze an open rate, a click rate, an unsubscribe rate, or a combination thereof associated with one or more of the electronic communications.

At 420, the data services platform 405 may detect an occurrence of an anomaly based on a communication metric of the analyzed set of communication metrics satisfying a communication metric threshold.

At 425, the data services platform 405 may generate, based on detecting the occurrence of the anomaly, a data object comprising metadata associated with the anomaly. In some examples, the data services platform 405 may generate the data object that may include an indication of a change in the communication metric relative to a predicted communication metric, an indication of an amount of electronic communications (e.g., emails) associated with the communication metric, or a combination thereof. In some cases, the data services platform 405 may generate the data object that may include indications of one or more actions that may be performed at the communication process flow from the communication platform. The data services platform 405 may generate a JSON object including data associated with the anomaly, the JSON object being ingestible by the communication platform for posting the entry into the communication channel. In some cases, the data services platform 405 may generate the data object that may include an indication of a link to an anomaly detection platform that may detect the occurrence of the anomaly.

At 430, the data services platform 405 may transmit, to the communication platform 410, a request that includes the data object, where the request may be configured to cause posting of an entry of the data object into a communication channel of the communication platform that is associated with the tenant.

At 435, the data services platform 405 may receive, from the communication platform 410 and in response to transmitting the request, a second request for additional information associated with the detected anomaly. In some examples, the data services platform 405 may receive, from the communication platform 410 and in response to transmitting the data object, a second request comprising an indication of an action associated with the communication process flow. The data services platform 405 may perform the action at the communication process flow, where the action may change a schedule associated with the electronic communications controlled by the communication process flow.

At 440, the data services platform 405 may generate, based on receiving the second request, a second data object that may include the additional information associated with the detected anomaly. In some cases, the data services platform 405 may identify, as the additional information, one or more contributing factors associated with the detected anomaly. The one or more contributing factors may be an identified electronic communication (e.g., an email) associated with the communication process flow, an indication of one or more content items associated with an electronic communication of the communication process flow, or a combination thereof.

At 445, the data services platform 405 may transmit, to the communication platform 410, a request that may include the second data object, where the request may be configured to cause a UI with the additional information to be displayed in the communication platform. In some cases, the data services platform 405 may receive, at the anomaly detection platform and from the communication platform 335 in response to transmitting the data object, a second request to view a UI associated with the occurrence of the anomaly. The data services platform 405 may display, based on receiving the second request, the UI associated with the occurrence of the anomaly, where the UI may include an indication of the communication metric.

Figure 5:
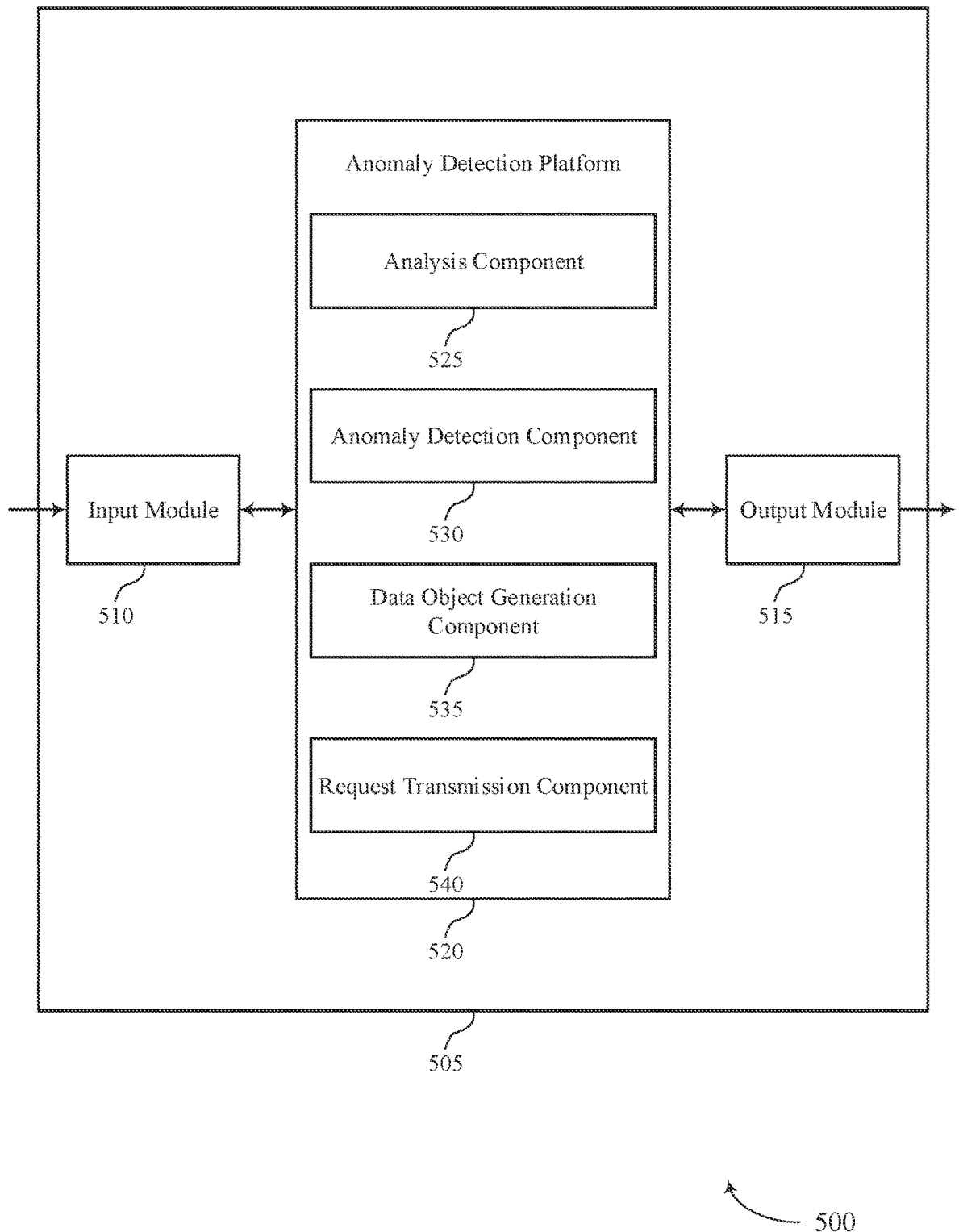
FIG. 5 shows a block diagram of an apparatus that supports techniques for cross platform communication process flow anomaly detection and display in accordance with aspects of the present disclosure.

FIG. 5 shows a block diagram 500 of a device 505 that supports techniques for cross platform communication process flow anomaly detection and display in accordance with aspects of the present disclosure. The device 505 may include an input module 510, an output module 515, and an anomaly detection platform 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the anomaly detection platform 520 to support techniques for cross platform communication process flow anomaly detection and display. In some cases, the input module 510 may be a component of an I/O controller 710 as described with reference to FIG. 7.

The output module 515 may manage output signals for the device 505. For example, the output module 515 may receive signals from other components of the device 505, such as the anomaly detection platform 520, and may transmit these signals to other components or devices. In some examples, the output module 515 may transmit output signals for display in a UI, for storage in a database or data store, for further processing at a server or server cluster, or for any other processes at any number of devices or systems. In some cases, the output module 515 may be a component of an I/O controller 710 as described with reference to FIG. 7.

For example, the anomaly detection platform 520 may include an analysis component 525, an anomaly detection component 530, a data object generation component 535, a request transmission component 540, or any combination thereof. In some examples, the anomaly detection platform 520, or various components thereof, may be configured to perform various operations (e.g., receiving, monitoring, transmitting) using or otherwise in cooperation with the input module 510, the output module 515, or both. For example, the anomaly detection platform 520 may receive information from the input module 510, send information to the output module 515, or be integrated in combination with the input module 510, the output module 515, or both to receive information, transmit information, or perform various other operations as described herein.

The anomaly detection platform 520 may support data processing in accordance with examples as disclosed herein. The analysis component 525 may be configured as or otherwise support a means for analyzing a set of communication metrics associated with a communication process flow that controls electronic communications between a tenant and a set of users corresponding to the tenant. The anomaly detection component 530 may be configured as or otherwise support a means for detecting an occurrence of an anomaly based at least in part on a communication metric of the analyzed set of communication metrics satisfying a communication metric threshold. The data object generation component 535 may be configured as or otherwise support a means for generating, based at least in part on detecting the occurrence of the anomaly, a data object comprising metadata associated with the anomaly. The request transmission component 540 may be configured as or otherwise support a means for transmitting, to a communication platform, a request that includes the data object, wherein the request is configured to cause posting of an entry of the data object into a communication channel of the communication platform that is associated with the tenant.

Figure 6:
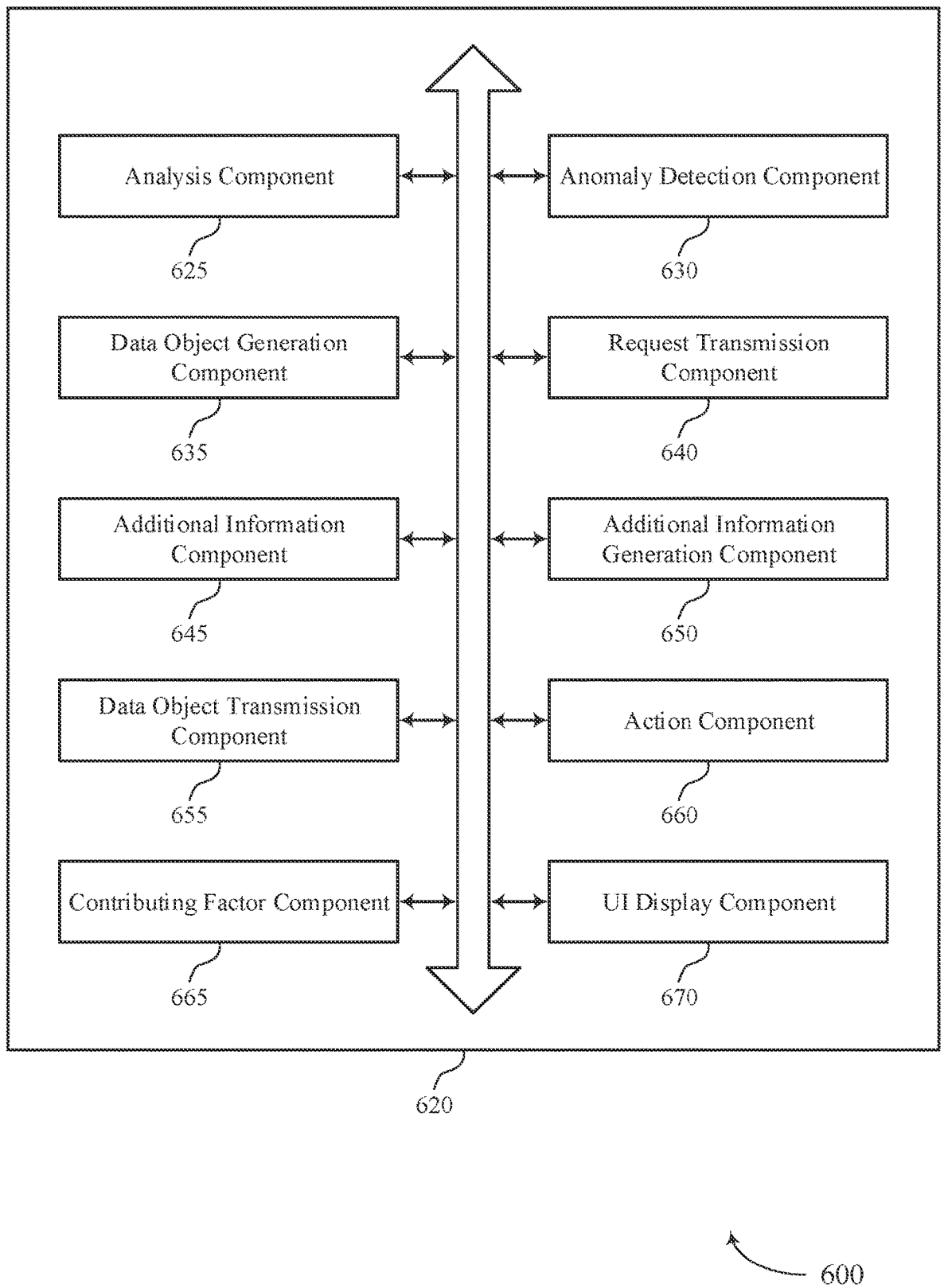
FIG. 6 shows a block diagram of an anomaly detection platform that supports techniques for cross platform communication process flow anomaly detection and display in accordance with aspects of the present disclosure.

FIG. 6 shows a block diagram 600 of an anomaly detection platform 620 that supports techniques for cross platform communication process flow anomaly detection and display in accordance with aspects of the present disclosure. The anomaly detection platform 620 may be an example of aspects of an anomaly detection platform or an anomaly detection platform 520, or both, as described herein. The anomaly detection platform 620, or various components thereof, may be an example of means for performing various aspects of techniques for cross platform communication process flow anomaly detection and display as described herein. For example, the anomaly detection platform 620 may include an analysis component 625, an anomaly detection component 630, a data object generation component 635, a request transmission component 640, an additional information component 645, an additional information generation component 650, a data object transmission component 655, an action component 660, a contributing factor component 665, a UI display component 670, or any combination thereof. Each of these components may communicate, directly or indirectly, with one another (e.g., via one or more buses).

The anomaly detection platform 620 may support data processing in accordance with examples as disclosed herein. The analysis component 625 may be configured as or otherwise support a means for analyzing a set of communication metrics associated with a communication process flow that controls electronic communications between a tenant and a set of users corresponding to the tenant. The anomaly detection component 630 may be configured as or otherwise support a means for detecting an occurrence of an anomaly based at least in part on a communication metric of the analyzed set of communication metrics satisfying a communication metric threshold. The data object generation component 635 may be configured as or otherwise support a means for generating, based at least in part on detecting the occurrence of the anomaly, a data object comprising metadata associated with the anomaly. The request transmission component 640 may be configured as or otherwise support a means for transmitting, to a communication platform, a request that includes the data object, wherein the request is configured to cause posting of an entry of the data object into a communication channel of the communication platform that is associated with the tenant.

In some examples, to support generating the data object, the data object generation component 635 may be configured as or otherwise support a means for generating the data object that includes an indication of a change in the communication metric relative to a predicted communication metric, an indication of an amount of electronic communications associated with the communication metric, or a combination thereof.

In some examples, to support analyzing the set of communication metrics, the analysis component 625 may be configured as or otherwise support a means for analyzing the set of communication metrics according to a schedule associated with the communication process flow.

In some examples, to support analyzing the set of communication metrics, the analysis component 625 may be configured as or otherwise support a means for analyzing the set of communication metrics associated with transmission of an electronic communication to the set of users, wherein the data object includes an indication of at least one of the set of communication metrics associated with the transmission of the electronic communication.

In some examples, to support analyzing the set of communication metrics, the analysis component 625 may be configured as or otherwise support a means for analyzing the set of communication metrics for an aggregated set of electronic communication transmissions to various subsets of the set of users according to the communication process flow, wherein the data object includes an indication of at least one of the set of communication metrics associated with the aggregated set of electronic communication transmissions.

In some examples, the additional information component 645 may be configured as or otherwise support a means for receiving, from the communication platform in response to transmitting the request, a second request for additional information associated with the detected anomaly. In some examples, the additional information generation component 650 may be configured as or otherwise support a means for generating, based at least in part on receiving the second request, a second data object that includes the additional information associated with the detected anomaly. In some examples, the data object transmission component 655 may be configured as or otherwise support a means for transmitting, to the communication platform, a request that includes the second data object, wherein the request is configured to cause a UI with the additional information to be displayed in the communication platform.

In some examples, the contributing factor component 665 may be configured as or otherwise support a means for identifying as the additional information, one or more contributing factors associated with the detected anomaly.

In some examples, the identified one or more contributing factors are an identified electronic communication associated with the communication process flow, an indication of one or more content items associated with an electronic communication of the communication process flow, or a combination thereof.

In some examples, to support analyzing the set of communication metrics, the analysis component 625 may be configured as or otherwise support a means for analyzing an open rate, a click rate, an unsubscribe rate, or a combination thereof, associated with one or more of the electronic communications.

In some examples, the action component 660 may be configured as or otherwise support a means for receiving, from the communication platform in response to transmitting the data object, a second request comprising an indication of an action associated with the communication process flow. In some examples, the action component 660 may be configured as or otherwise support a means for performing the action at the communication process flow, wherein the action changes a schedule associated with the electronic communications controlled by the communication process flow.

In some examples, to support generating the data object, the data object generation component 635 may be configured as or otherwise support a means for generating the data object that includes indications of one or more actions that may be performed at the communication process flow from the communication platform, wherein the second request is received via activation of one of the indications.

In some examples, to support generating the data object, the data object generation component 635 may be configured as or otherwise support a means for generating the data object that includes an indication of a link to an anomaly detection platform that detects the occurrence of the anomaly.

In some examples, the UI display component 670 may be configured as or otherwise support a means for receiving, at the anomaly detection platform and from the communication platform in response to transmitting the data object, a second request to view a UI associated with the occurrence of the anomaly. In some examples, the UI display component 670 may be configured as or otherwise support a means for displaying, based at least in part on receiving the second request, the UI associated with the occurrence of the anomaly, wherein the UI includes an indication of the communication metric.

In some examples, to support generating the data object, the data object generation component 635 may be configured as or otherwise support a means for generating a JSON object including data associated with the anomaly, the JSON object being ingestible by the communication platform for posting the entry into the communication channel.

Figure 7:
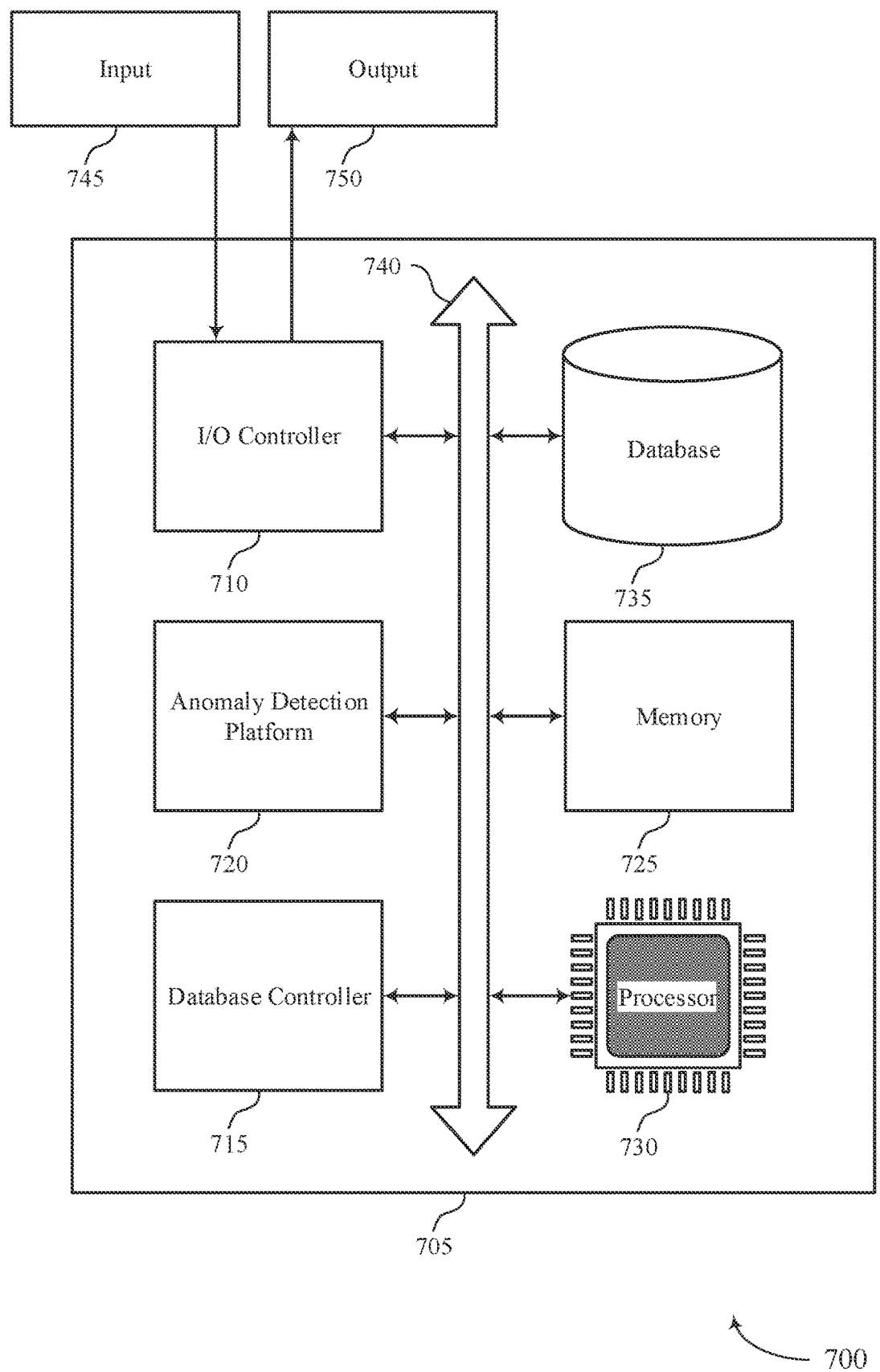
FIG. 7 shows a diagram of a system including a device that supports techniques for cross platform communication process flow anomaly detection and display in accordance with aspects of the present disclosure.

FIG. 7 shows a diagram of a system 700 including a device 705 that supports techniques for cross platform communication process flow anomaly detection and display in accordance with aspects of the present disclosure. The device 705 may be an example of or include the components of a device 505 as described herein. The device 705 may include components for bi-directional data communications including components for transmitting and receiving communications, such as an anomaly detection platform 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a digital signal processor (DSP), a computer processing unit (CPU), a microcontroller, an application-specific integrated circuit (ASIC), a field programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for cross platform communication process flow anomaly detection and display).

The anomaly detection platform 720 may support data processing in accordance with examples as disclosed herein. For example, the anomaly detection platform 720 may be configured as or otherwise support a means for analyzing a set of communication metrics associated with a communication process flow that controls electronic communications between a tenant and a set of users corresponding to the tenant. The anomaly detection platform 720 may be configured as or otherwise support a means for detecting an occurrence of an anomaly based at least in part on a communication metric of the analyzed set of communication metrics satisfying a communication metric threshold. The anomaly detection platform 720 may be configured as or otherwise support a means for generating, based at least in part on detecting the occurrence of the anomaly, a data object comprising metadata associated with the anomaly. The anomaly detection platform 720 may be configured as or otherwise support a means for transmitting, to a communication platform, a request that includes the data object, wherein the request is configured to cause posting of an entry of the data object into a communication channel of the communication platform that is associated with the tenant.

By including or configuring the anomaly detection platform 720 in accordance with examples as described herein, the device 705 may support techniques for cross-platform compatibility between a communication process flow management service and an external communication platform, which may support improved workflow efficiencies as well as reduced communication resource overhead.

Figure 8:
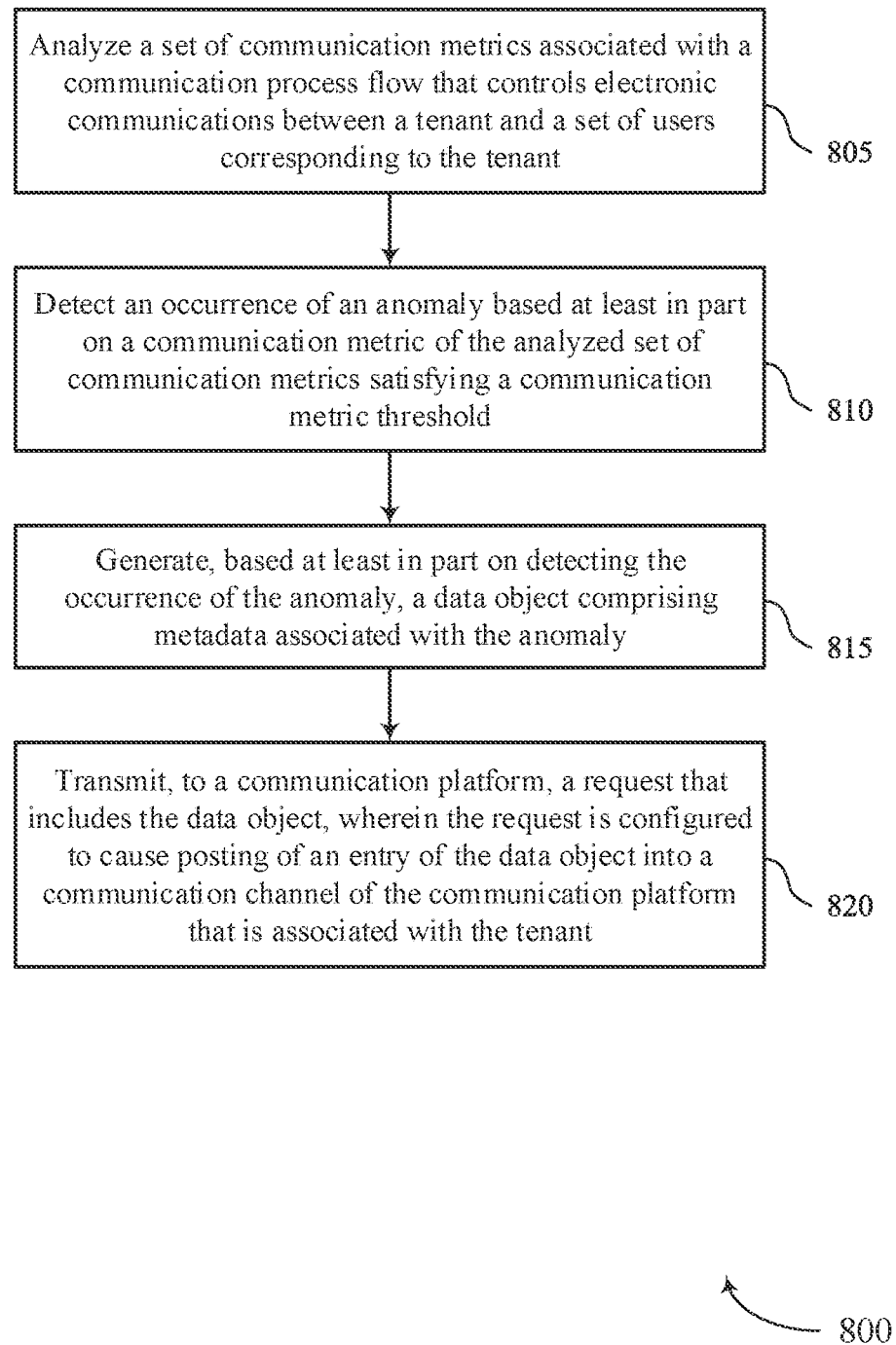
FIGS. 8 through 10 show flowcharts illustrating methods that support techniques for cross platform communication process flow anomaly detection and display in accordance with aspects of the present disclosure.

FIG. 8 shows a flowchart illustrating a method 800 that supports techniques for cross platform communication process flow anomaly detection and display in accordance with aspects of the present disclosure. The operations of the method 800 may be implemented by an application server or its components as described herein. For example, the operations of the method 800 may be performed by an application server as described with reference to FIGS. 1 through 7. In some examples, an application server may execute a set of instructions to control the functional elements of the application server to perform the described functions. Additionally or alternatively, the application server may perform aspects of the described functions using special-purpose hardware.

At 805, the method may include analyzing a set of communication metrics associated with a communication process flow that controls electronic communications between a tenant and a set of users corresponding to the tenant. The operations of 805 may be performed in accordance with examples as disclosed herein. In some examples, aspects of the operations of 805 may be performed by an analysis component 625 as described with reference to FIG. 6.

At 810, the method may include detecting an occurrence of an anomaly based at least in part on a communication metric of the analyzed set of communication metrics satisfying a communication metric threshold. The operations of 810 may be performed in accordance with examples as disclosed herein. In some examples, aspects of the operations of 810 may be performed by an anomaly detection component 630 as described with reference to FIG. 6.

At 815, the method may include generating, based at least in part on detecting the occurrence of the anomaly, a data object comprising metadata associated with the anomaly. The operations of 815 may be performed in accordance with examples as disclosed herein. In some examples, aspects of the operations of 815 may be performed by a data object generation component 635 as described with reference to FIG. 6.

At 820, the method may include transmitting, to a communication platform, a request that includes the data object, wherein the request is configured to cause posting of an entry of the data object into a communication channel of the communication platform that is associated with the tenant. The operations of 820 may be performed in accordance with examples as disclosed herein. In some examples, aspects of the operations of 820 may be performed by a request transmission component 640 as described with reference to FIG. 6.

Figure 9:
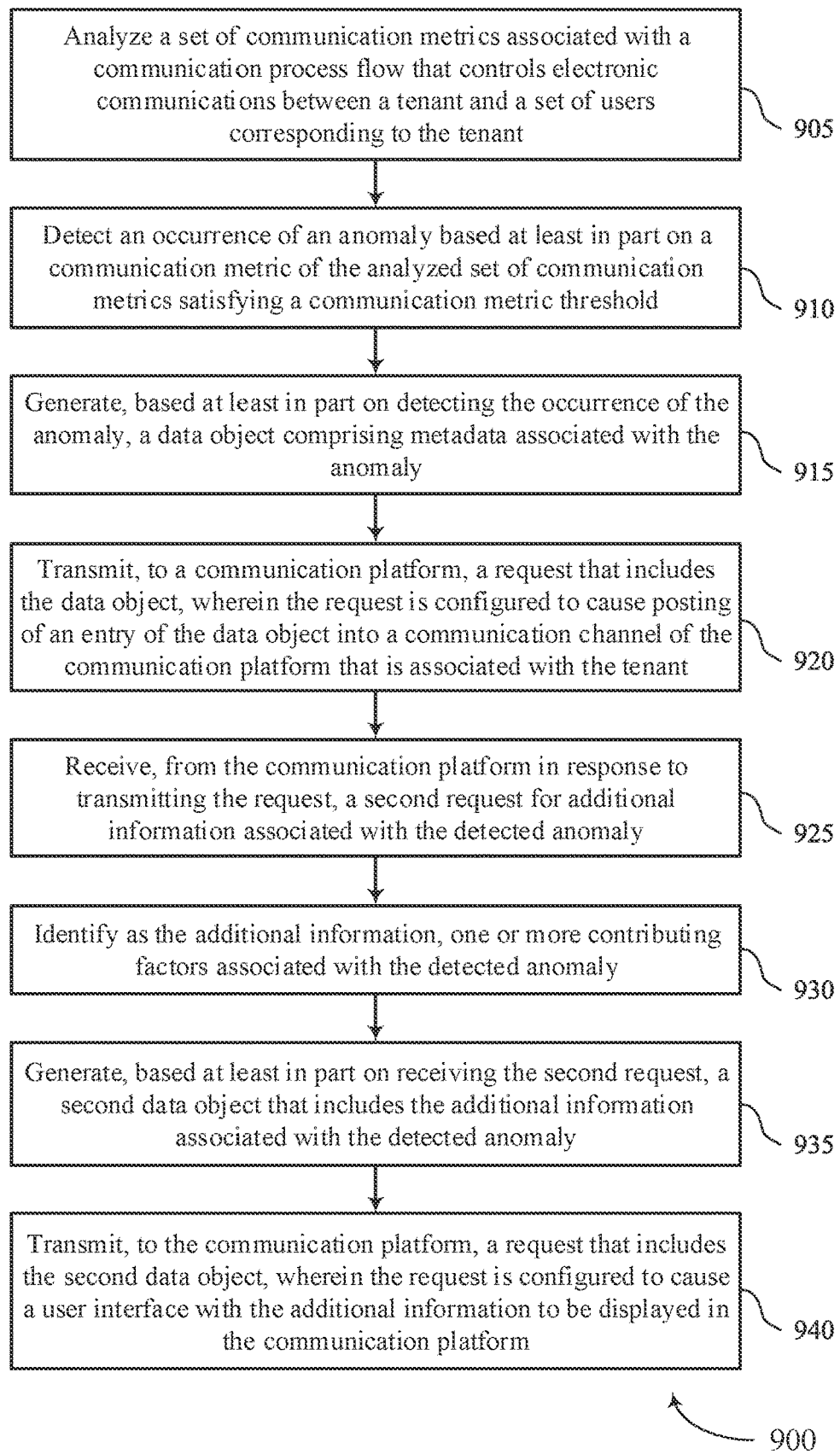

FIG. 9 shows a flowchart illustrating a method 900 that supports techniques for cross platform communication process flow anomaly detection and display in accordance with aspects of the present disclosure. The operations of the method 900 may be implemented by an application server or its components as described herein. For example, the operations of the method 900 may be performed by an application server as described with reference to FIGS. 1 through 7. In some examples, an application server may execute a set of instructions to control the functional elements of the application server to perform the described functions. Additionally or alternatively, the application server may perform aspects of the described functions using special-purpose hardware.

At 905, the method may include analyzing a set of communication metrics associated with a communication process flow that controls electronic communications between a tenant and a set of users corresponding to the tenant. The operations of 905 may be performed in accordance with examples as disclosed herein. In some examples, aspects of the operations of 905 may be performed by an analysis component 625 as described with reference to FIG. 6.

At 910, the method may include detecting an occurrence of an anomaly based at least in part on a communication metric of the analyzed set of communication metrics satisfying a communication metric threshold. The operations of 910 may be performed in accordance with examples as disclosed herein. In some examples, aspects of the operations of 910 may be performed by an anomaly detection component 630 as described with reference to FIG. 6.

At 915, the method may include generating, based at least in part on detecting the occurrence of the anomaly, a data object comprising metadata associated with the anomaly. The operations of 915 may be performed in accordance with examples as disclosed herein. In some examples, aspects of the operations of 915 may be performed by a data object generation component 635 as described with reference to FIG. 6.

At 920, the method may include transmitting, to a communication platform, a request that includes the data object, wherein the request is configured to cause posting of an entry of the data object into a communication channel of the communication platform that is associated with the tenant. The operations of 920 may be performed in accordance with examples as disclosed herein. In some examples, aspects of the operations of 920 may be performed by a request transmission component 640 as described with reference to FIG. 6.

At 925, the method may include receiving, from the communication platform in response to transmitting the request, a second request for additional information associated with the detected anomaly. The operations of 925 may be performed in accordance with examples as disclosed herein. In some examples, aspects of the operations of 925 may be performed by an additional information component 645 as described with reference to FIG. 6.

At 930, the method may include identifying as the additional information, one or more contributing factors associated with the detected anomaly. The operations of 930 may be performed in accordance with examples as disclosed herein. In some examples, aspects of the operations of 930 may be performed by a contributing factor component 665 as described with reference to FIG. 6.

At 935, the method may include generating, based at least in part on receiving the second request, a second data object that includes the additional information associated with the detected anomaly. The operations of 935 may be performed in accordance with examples as disclosed herein. In some examples, aspects of the operations of 935 may be performed by an additional information generation component 650 as described with reference to FIG. 6.

At 940, the method may include transmitting, to the communication platform, a request that includes the second data object, wherein the request is configured to cause a UI with the additional information to be displayed in the communication platform. The operations of 940 may be performed in accordance with examples as disclosed herein. In some examples, aspects of the operations of 940 may be performed by a data object transmission component 655 as described with reference to FIG. 6.

Figure 10:
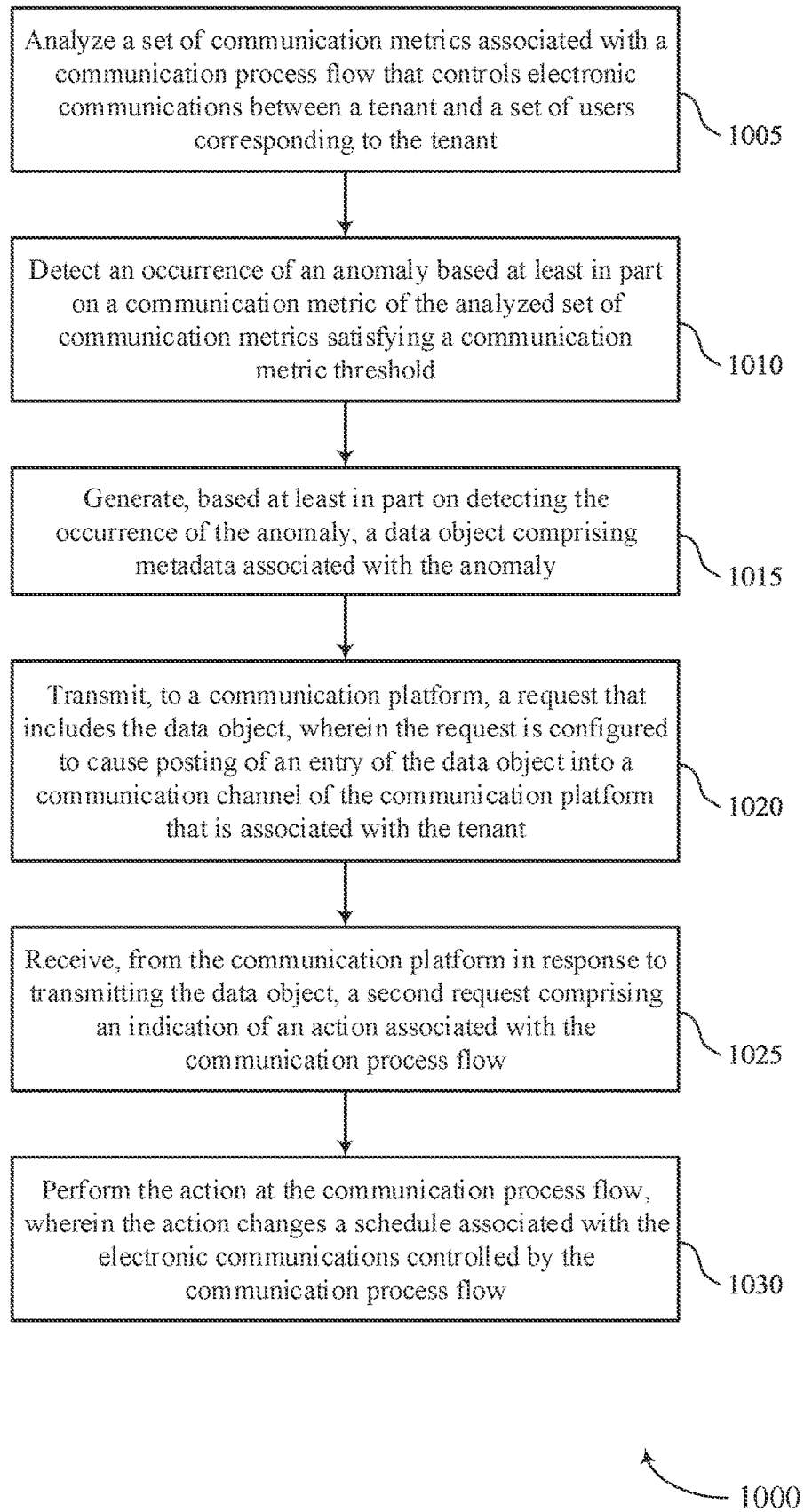

FIG. 10 shows a flowchart illustrating a method 1000 that supports techniques for cross platform communication process flow anomaly detection and display in accordance with aspects of the present disclosure. The operations of the method 1000 may be implemented by an application server or its components as described herein. For example, the operations of the method 1000 may be performed by an application server as described with reference to FIGS. 1 through 7. In some examples, an application server may execute a set of instructions to control the functional elements of the application server to perform the described functions. Additionally or alternatively, the application server may perform aspects of the described functions using special-purpose hardware.

At 1005, the method may include analyzing a set of communication metrics associated with a communication process flow that controls electronic communications between a tenant and a set of users corresponding to the tenant. The operations of 1005 may be performed in accordance with examples as disclosed herein. In some examples, aspects of the operations of 1005 may be performed by an analysis component 625 as described with reference to FIG. 6.

At 1010, the method may include detecting an occurrence of an anomaly based at least in part on a communication metric of the analyzed set of communication metrics satisfying a communication metric threshold. The operations of 1010 may be performed in accordance with examples as disclosed herein. In some examples, aspects of the operations of 1010 may be performed by an anomaly detection component 630 as described with reference to FIG. 6.

At 1015, the method may include generating, based at least in part on detecting the occurrence of the anomaly, a data object comprising metadata associated with the anomaly. The operations of 1015 may be performed in accordance with examples as disclosed herein. In some examples, aspects of the operations of 1015 may be performed by a data object generation component 635 as described with reference to FIG. 6.

At 1020, the method may include transmitting, to a communication platform, a request that includes the data object, wherein the request is configured to cause posting of an entry of the data object into a communication channel of the communication platform that is associated with the tenant. The operations of 1020 may be performed in accordance with examples as disclosed herein. In some examples, aspects of the operations of 1020 may be performed by a request transmission component 640 as described with reference to FIG. 6.

At 1025, the method may include receiving, from the communication platform in response to transmitting the data object, a second request comprising an indication of an action associated with the communication process flow. The operations of 1025 may be performed in accordance with examples as disclosed herein. In some examples, aspects of the operations of 1025 may be performed by an action component 660 as described with reference to FIG. 6.

At 1030, the method may include performing the action at the communication process flow, wherein the action changes a schedule associated with the electronic communications controlled by the communication process flow. The operations of 1030 may be performed in accordance with examples as disclosed herein. In some examples, aspects of the operations of 1030 may be performed by an action component 660 as described with reference to FIG. 6.

A method for data processing is described. The method may include analyzing a set of communication metrics associated with a communication process flow that controls electronic communications between a tenant and a set of users corresponding to the tenant, detecting an occurrence of an anomaly based at least in part on a communication metric of the analyzed set of communication metrics satisfying a communication metric threshold, generating, based at least in part on detecting the occurrence of the anomaly, a data object comprising metadata associated with the anomaly, and transmitting, to a communication platform, a request that includes the data object, wherein the request is configured to cause posting of an entry of the data object into a communication channel of the communication platform that is associated with the tenant.

An apparatus for data processing is described. The apparatus may include a processor, memory coupled with the processor, and instructions stored in the memory. The instructions may be executable by the processor to cause the apparatus to analyze a set of communication metrics associated with a communication process flow that controls electronic communications between a tenant and a set of users corresponding to the tenant, detect an occurrence of an anomaly based at least in part on a communication metric of the analyzed set of communication metrics satisfying a communication metric threshold, generate, based at least in part on detecting the occurrence of the anomaly, a data object comprising metadata associated with the anomaly, and transmit, to a communication platform, a request that includes the data object, wherein the request is configured to cause posting of an entry of the data object into a communication channel of the communication platform that is associated with the tenant.

Another apparatus for data processing is described. The apparatus may include means for analyzing a set of communication metrics associated with a communication process flow that controls electronic communications between a tenant and a set of users corresponding to the tenant, means for detecting an occurrence of an anomaly based at least in part on a communication metric of the analyzed set of communication metrics satisfying a communication metric threshold, means for generating, based at least in part on detecting the occurrence of the anomaly, a data object comprising metadata associated with the anomaly, and means for transmitting, to a communication platform, a request that includes the data object, wherein the request is configured to cause posting of an entry of the data object into a communication channel of the communication platform that is associated with the tenant.

A non-transitory computer-readable medium storing code for data processing is described. The code may include instructions executable by a processor to analyze a set of communication metrics associated with a communication process flow that controls electronic communications between a tenant and a set of users corresponding to the tenant, detect an occurrence of an anomaly based at least in part on a communication metric of the analyzed set of communication metrics satisfying a communication metric threshold, generate, based at least in part on detecting the occurrence of the anomaly, a data object comprising metadata associated with the anomaly, and transmit, to a communication platform, a request that includes the data object, wherein the request is configured to cause posting of an entry of the data object into a communication channel of the communication platform that is associated with the tenant.

In some examples of the method, apparatuses, and non-transitory computer-readable medium described herein, generating the data object may include operations, features, means, or instructions for generating the data object that includes an indication of a change in the communication metric relative to a predicted communication metric, an indication of an amount of electronic communications associated with the communication metric, or a combination thereof.

In some examples of the method, apparatuses, and non-transitory computer-readable medium described herein, analyzing the set of communication metrics may include operations, features, means, or instructions for analyzing the set of communication metrics according to a schedule associated with the communication process flow.

In some examples of the method, apparatuses, and non-transitory computer-readable medium described herein, analyzing the set of communication metrics may include operations, features, means, or instructions for analyzing the set of communication metrics associated with transmission of an electronic communication to the set of users, wherein the data object includes an indication of at least one of the set of communication metrics associated with the transmission of the electronic communication.

In some examples of the method, apparatuses, and non-transitory computer-readable medium described herein, analyzing the set of communication metrics may include operations, features, means, or instructions for analyzing the set of communication metrics for an aggregated set of electronic communication transmissions to various subsets of the set of users according to the communication process flow, wherein the data object includes an indication of at least one of the set of communication metrics associated with the aggregated set of electronic communication transmissions.

Some examples of the method, apparatuses, and non-transitory computer-readable medium described herein may further include operations, features, means, or instructions for receiving, from the communication platform in response to transmitting the request, a second request for additional information associated with the detected anomaly, generating, based at least in part on receiving the second request, a second data object that includes the additional information associated with the detected anomaly, and transmitting, to the communication platform, a request that includes the second data object, wherein the request may be configured to cause a UI with the additional information to be displayed in the communication platform.

Some examples of the method, apparatuses, and non-transitory computer-readable medium described herein may further include operations, features, means, or instructions for identifying as the additional information, one or more contributing factors associated with the detected anomaly.

In some examples of the method, apparatuses, and non-transitory computer-readable medium described herein, the identified one or more contributing factors may be an identified electronic communication associated with the communication process flow, an indication of one or more content items associated with an electronic communication of the communication process flow, or a combination thereof.

In some examples of the method, apparatuses, and non-transitory computer-readable medium described herein, analyzing the set of communication metrics may include operations, features, means, or instructions for analyzing an open rate, a click rate, an unsubscribe rate, or a combination thereof, associated with one or more of the electronic communications.

Some examples of the method, apparatuses, and non-transitory computer-readable medium described herein may further include operations, features, means, or instructions for receiving, from the communication platform in response to transmitting the data object, a second request comprising an indication of an action associated with the communication process flow and performing the action at the communication process flow, wherein the action changes a schedule associated with the electronic communications controlled by the communication process flow.

In some examples of the method, apparatuses, and non-transitory computer-readable medium described herein, generating the data object may include operations, features, means, or instructions for generating the data object that includes indications of one or more actions that may be performed at the communication process flow from the communication platform, wherein the second request may be received via activation of one of the indications.

In some examples of the method, apparatuses, and non-transitory computer-readable medium described herein, generating the data object may include operations, features, means, or instructions for generating the data object that includes an indication of a link to an anomaly detection platform that detects the occurrence of the anomaly.

Some examples of the method, apparatuses, and non-transitory computer-readable medium described herein may further include operations, features, means, or instructions for receiving, at the anomaly detection platform and from the communication platform in response to transmitting the data object, a second request to view a UI associated with the occurrence of the anomaly and displaying, based at least in part on receiving the second request, the UI associated with the occurrence of the anomaly, wherein the UI includes an indication of the communication metric.

In some examples of the method, apparatuses, and non-transitory computer-readable medium described herein, generating the data object may include operations, features, means, or instructions for generating a JSON object including data associated with the anomaly, the JSON object being ingestible by the communication platform for posting the entry into the communication channel.

It should be noted that the methods described above describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   analyzing a set of communication metrics associated with a communication process flow that controls electronic communications between a tenant and a set of users corresponding to the tenant;
   detecting an occurrence of an anomaly based at least in part on a communication metric of the analyzed set of communication metrics satisfying a communication metric threshold;
   generating, based at least in part on detecting the occurrence of the anomaly, a data object comprising metadata associated with the anomaly, wherein the data object includes an indication of a change in the communication metric relative to a predicted communication metric, an indication of an amount of electronic communications associated with the communication metric, or a combination thereof; and
   transmitting, to a communication platform, a request that includes the data object, wherein the request is configured to cause posting of an entry of the data object into a communication channel of the communication platform that is associated with the tenant.

2. The method of claim 1, wherein analyzing the set of communication metrics comprises:
   analyzing the set of communication metrics according to a schedule associated with the communication process flow.

3. The method of claim 1, wherein analyzing the set of communication metrics comprises:
   analyzing the set of communication metrics associated with transmission of an electronic communication to the set of users, wherein the data object includes an indication of at least one of the set of communication metrics associated with the transmission of the electronic communication.

4. The method of claim 1, wherein analyzing the set of communication metrics comprises:
   analyzing the set of communication metrics for an aggregated set of electronic communication transmissions to various subsets of the set of users according to the communication process flow, wherein the data object includes an indication of at least one of the set of communication metrics associated with the aggregated set of electronic communication transmissions.

5. The method of claim 1, further comprising:
   receiving, from the communication platform in response to transmitting the request, a second request for additional information associated with the anomaly;
   generating, based at least in part on receiving the second request, a second data object that includes the additional information associated with the anomaly; and
   transmitting, to the communication platform, a request that includes the second data object, wherein the request is configured to cause a user interface with the additional information to be displayed in the communication platform.

6. The method of claim 5, further comprising:
   identifying, as the additional information, one or more contributing factors associated with the anomaly.

7. The method of claim 6, wherein the identified one or more contributing factors are an identified electronic communication associated with the communication process flow, an indication of one or more content items associated with an electronic communication of the communication process flow, or a combination thereof.

8. The method of claim 1, wherein analyzing the set of communication metrics comprises:
analyzing an open rate, a click rate, an unsubscribe rate, or a combination thereof, associated with one or more of the electronic communications.

9. The method of claim 1, further comprising:
receiving, from the communication platform in response to transmitting the data object, a second request comprising an indication of an action associated with the communication process flow; and
performing the action at the communication process flow, wherein the action changes a schedule associated with the electronic communications controlled by the communication process flow.

10. The method of claim 9, wherein generating the data object comprises:
generating the data object that includes indications of one or more actions that may be performed at the communication process flow from the communication platform,
wherein the second request is received via activation of one of the indications.

11. The method of claim 1, wherein generating the data object comprises:
generating the data object that includes an indication of a link to an anomaly detection platform that detects the occurrence of the anomaly.

12. The method of claim 11, further comprising:
receiving, at the anomaly detection platform and from the communication platform in response to transmitting the data object, a second request to view a user interface associated with the occurrence of the anomaly; and
displaying, based at least in part on receiving the second request, the user interface associated with the occurrence of the anomaly, wherein the user interface includes an indication of the communication metric.

13. The method of claim 1, wherein generating the data object comprises:
generating a JavaScript object notation (JSON) object including data associated with the anomaly, the JSON object being ingestible by the communication platform for posting the entry into the communication channel.

14. An apparatus for data processing, comprising:
a processor;
memory coupled with the processor; and
instructions stored in the memory and executable by the processor to cause the apparatus to:
analyze a set of communication metrics associated with a communication process flow that controls electronic communications between a tenant and a set of users corresponding to the tenant;
detect an occurrence of an anomaly based at least in part on a communication metric of the analyzed set of communication metrics satisfying a communication metric threshold;
generate, based at least in part on detecting the occurrence of the anomaly, a data object comprising metadata associated with the anomaly, wherein the data object includes an indication of a change in the communication metric relative to a predicted communication metric, an indication of an amount of electronic communications associated with the communication metric, or a combination thereof; and
transmit, to a communication platform, a request that includes the data object, wherein the request is configured to cause posting of an entry of the data object into a communication channel of the communication platform that is associated with the tenant.

15. The apparatus of claim 14, wherein the instructions to analyze the set of communication metrics are executable by the processor to cause the apparatus to:
analyze the set of communication metrics according to a schedule associated with the communication process flow.

16. A non-transitory computer-readable medium storing code for data processing, the code comprising instructions executable by a processor to:
analyze a set of communication metrics associated with a communication process flow that controls electronic communications between a tenant and a set of users corresponding to the tenant;
detect an occurrence of an anomaly based at least in part on a communication metric of the analyzed set of communication metrics satisfying a communication metric threshold;
generate, based at least in part on detecting the occurrence of the anomaly, a data object comprising metadata associated with the anomaly, wherein the data object includes an indication of a change in the communication metric relative to a predicted communication metric, an indication of an amount of electronic communications associated with the communication metric, or a combination thereof; and
transmit, to a communication platform, a request that includes the data object, wherein the request is configured to cause posting of an entry of the data object into a communication channel of the communication platform that is associated with the tenant.

17. The non-transitory computer-readable medium of claim 16, wherein the instructions to analyze the set of communication metrics are executable by the processor to:
analyze the set of communication metrics according to a schedule associated with the communication process flow.

18. The method of claim 1, wherein transmitting the request comprises:
transmitting the request that is configured to cause posting of the entry of the data object into the communication channel that is associated with a second set of users that manage the communication process flow at a communication process flow management service.

* * * * *